J. NAËDER.
PACKING GLAND OR COLLAR.
APPLICATION FILED MAY 25, 1910.
968,390. Patented Aug. 23, 1910.
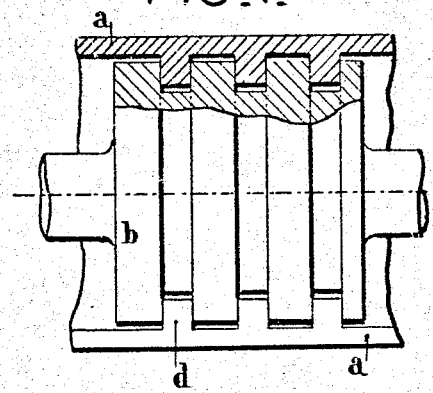
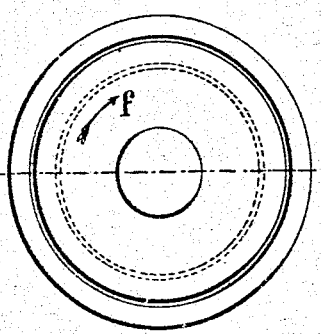
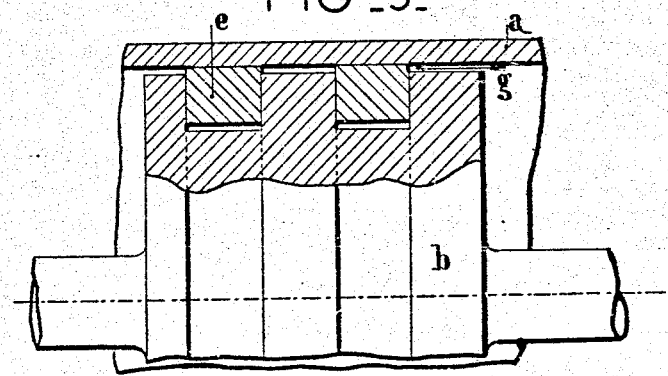
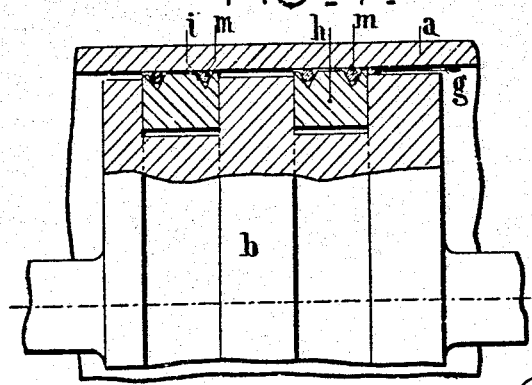

UNITED STATES PATENT OFFICE.

JULES NAËDER, OF SEINE-ET-OISE, FRANCE.

PACKING GLAND OR COLLAR.

968,390.  Specification of Letters Patent. Patented Aug. 23, 1910.

Application filed May 25, 1910. Serial No. 563,316.

*To all whom it may concern:*

Be it known that I, JULES NAËDER, a citizen of the Republic of France, residing in Seine-et-Oise, France, have invented Improvements in Packing Glands or Collars, of which the following is a specification.

In many rotary engines, as well as turbines, as heretofore usually constructed the cylindrical spaces in which the steam or other motive fluid employed acts upon the movable pistons or blades are closed at the ends by piston-like bodies fitted with packing segments. Instead of moving in an axial direction after the manner of pistons in reciprocating engines these piston-like bodies only rotate about their axes which generally correspond to the axes of the driving shafts which are supported by the said bodies. These piston-like bodies then, furnished with packing segments, simply serve as cylinder ends or covers and their sole purpose is to insure fluid tightness of the cylindrical spaces in which the steam or other motive fluid adopted works. The packing segments with which they are fitted do not act in the same way as the packing segments of a reciprocating piston. In the first place they bear with more or less force against the wall of the cylindrical casings in such a way as to be either held stationary or to only rotate at a very low speed, relatively to the speed of the piston-like bodies. Secondly, they are forced with considerable pressure against those walls of the recesses in which they are held toward which the thrust of the motive fluid moves them. This results in considerable friction that reduces the mechanical efficiency of the engine.

Figure 1 of the accompanying drawings is a sectional elevation and Fig. 2 is an end view illustrating a heretofore proposed packing arrangement. Fig. 3 is a similar view to Fig. 1 showing another known and usual packing arrangement, and Fig. 4 is a similar view to Figs. 1 and 3 showing packing glands or collars constructed and arranged according to this invention.

If in place of the packing segments there are provided packing collars or glands formed integral with the cylinder other disadvantages ensue. Thus for instance if a cylinder $a$, Figs. 1 and 2, is provided with internally arranged collars $d$ fitting in holding grooves formed therefor in the rotary end closing member $b$, then when the latter rotates in the direction of the arrow $f$, Fig. 2, it is obvious that if such member $b$ is forced longitudinally, as by a thrust due to expansion, or other strain, a considerable amount of work is absorbed through the friction of the holding grooves on the collars $d$. Furthermore, as already stated, the packing collars $d$, instead of being integral with the cylinder $a$, are made up of segments, whether spring pressed or not, such as are commonly employed in the construction of rotary engines, that is to say, if they are formed as split rings $e$ fitting the cylinder $a$ as shown in Fig. 3 they will evidently be influenced by the pressure of a fluid acting on one of their faces, in the direction of the arrow $g$, for instance, and their opposite faces will be thereby forced against the corresponding walls of the grooves in the rotary member $b$ so that this construction also will result in such friction as to absorb a considerable amount of work.

Now the object of this invention is to provide a packing gland or collar in which these disadvantages are obviated.

As shown in Fig. 4, the improved gland or collar consists of a ring $h$ which may be formed in one or more parts, but if of more than one part the several parts must be rigidly connected together so as to constitute a closed ring having the same capacity of resisting alteration of form as if it were formed in one piece only.

The external diameter of the ring $h$ is approximately the same as the internal diameter of the cylinder $a$ in which it fits, but in its periphery there are formed one or more annular grooves $i$ of triangular or other suitable form, in which is or are placed a wire or wires $m$ of ductile metal such as soft iron, copper, lead, etc., adapted to form a fluid-tight joint between the cylinder $a$ and the ring $h$ and at the same time to set up between those two parts sufficient friction or adherence to prevent the rotation of the member $b$ from taking the said ring $h$ along with it by friction on one of the end faces of the ring. On the other hand the degree of this friction or adherence of the ring $m$ is such that under the strain of a powerful lateral thrust exceeding that of the steam or other fluid employed in the chamber packed by the gland, such for instance as a thrust caused by expansion, the ring $m$ will move longitudinally in the direction of the arrow $g$ to an extent sufficient to prevent the enormous resistances that would otherwise be set up. It will thus be understood that the interposed wire $m$ has the effect of as it were welding the ring $h$ to the wall of the cylinder, in an intermittent manner. It is therefore correct to state that relatively to a thrust in the direction of rotation the ring $h$ acts as a stationary collar or gland and consequently does not set up any friction in the grooves of the rotary member $b$. On the contrary, for those pressures exerted longitudinally, which are greater than the thrust of the motive fluid, the ring $h$ acts as an ordinary segment packing ring and allows the necessary amount of endwise movement to provide for the expansion of the parts.

The improved gland or collar is particularly applicable to rotary steam or other motive fluid engines such as compressors, pumps, turbines, etc., but it is capable of application in all cases where a cylindrical chamber containing a fluid under pressure, is to be closed in a fluid-tight manner by a rotary part.

What I claim is:—

1. A gland or collar for making a fluid tight joint between a rotary part and a stationary cylindrical part, comprising a ring adapted to be moved by the rotary part and formed with a peripheral groove, and a wire of ductile material located in the groove of said ring and bearing against the inner face of said cylindrical part.

2. A gland or collar for making a fluid tight joint between a rotary part and a stationary cylindrical part, comprising a ring adapted to be moved by the rotary part and formed with a peripheral groove of V shape, and a wire of ductile material located in the groove of said ring and bearing against the inner face of said cylindrical part.

3. A gland or collar for making a fluid tight joint between a rotary part and a stationary cylindrical part, comprising a ring engaging in a groove formed in the rotary part and formed with a peripheral groove, and a wire of ductile material located in the groove of said ring and bearing against the inner face of said cylindrical part.

4. A gland or collar for making a fluid tight joint between a rotary part and a stationary cylindrical part, comprising a ring engaging in a groove formed in the rotary part and provided with a peripheral groove of V shape, and a wire of ductile material located in the groove of said ring and bearing against the inner face of said cylindrical part.

5. A gland or collar for making a fluid tight joint between a rotary part and a stationary cylindrical part, comprising a ring adapted to be moved by the rotary part and formed with a number of peripheral grooves, and wire of ductile material located in the grooves of said ring and bearing against the inner face of said cylindrical part.

6. A gland or collar for making a fluid tight joint between a rotary part and a stationary cylindrical part, comprising a ring adapted to be moved by the rotary part and formed with a number of V-shaped peripheral grooves, and wire of ductile material located in the grooves of said ring and bearing against the inner face of said cylindrical part.

Signed at Paris, France this seventeenth day of May 1910.

JULES NAËDER.

Witnesses:
H. C. COXE,
M. FEROLO.